United States Patent [19]

Byer et al.

[11] Patent Number: 4,860,295
[45] Date of Patent: Aug. 22, 1989

[54] CLADDING FOR TRANSVERSE-PUMPED SOLID-STATE LASER

[75] Inventors: Robert L. Byer, Stanford, Calif.; Tso Y. Fan, Somerville, Mass.

[73] Assignee: The United States of America as represented by the Administrator of the National Aeronautics and Space Administration, Washington, D.C.

[21] Appl. No.: 283,431

[22] Filed: Dec. 12, 1988

[51] Int. Cl.$^4$ .............................................. H01S 3/098
[52] U.S. Cl. ...................................... 372/19; 372/39; 372/66; 372/70
[58] Field of Search .................. 372/39, 40, 41, 19, 372/66, 69, 70

[56] References Cited

U.S. PATENT DOCUMENTS

| | | | |
|---|---|---|---|
| 3,087,374 | 4/1963 | Devlin et al. | 88/1 |
| 3,219,585 | 11/1965 | Kaiser | 252/301.1 |
| 3,284,722 | 11/1966 | Gray | 372/75 |
| 3,308,394 | 3/1967 | Snitzer et al. | 372/19 |
| 3,341,787 | 9/1967 | Biard et al. | 372/75 |
| 3,508,165 | 4/1970 | Nicolai | 372/41 |
| 3,636,473 | 1/1972 | Young | 372/40 |
| 3,646,473 | 2/1972 | Young | 372/40 |
| 3,683,296 | 8/1972 | Scalise | 372/36 |
| 3,684,980 | 8/1972 | Kay | 331/94.5 |
| 3,821,663 | 6/1974 | Brenner | 372/75 |
| 3,982,201 | 9/1976 | Rosenkrantz et al. | 331/94.5 |
| 4,500,996 | 2/1985 | Sasnett et al. | 372/19 |

OTHER PUBLICATIONS

Composite Rod Optical Masers, by G. E. Devlin, J. McKenna, A. D. May and A. L. Schawlow, Applied Optics, vol. 1, No. 1, Jan. 1962.

A. Yariv, "Optical Resonators", Chapter 4 of *Introduction to Optical Electronics* (Holt, Rinehart and Winston, New York, 1976), pp. 58–87.

Diode Laser-Pumped Solid State Lasers, by Robert L. Byer, Science, Reprint Series, Feb. 12, 1988, vol. 239, pp. 742–747, copyright 1988 by the American Association for the Advancement of Science.

Diode-Laser-Array-Pumped Neodymium Slab Oscillators, by M. K. Reed, W. J. Kozlovsky and R. L. Byer, reprinted from Optics Letters, vol. 13, p. 204, Mar. 1988. Copyright 1988 by Optical Society of America.

Single-Transverse-Diode $LiNdP_4O_{12}$ Slab Wave Guide Laser, by Ken'ichi Kubodera and Kenju Otsuka; J. Appl. Phys. 50(2), Feb. 1979.

*Primary Examiner*—James W. Davie
*Attorney, Agent, or Firm*—Thomas H. Jones; John R. Manning; Charles E. B. Glenn

[57] ABSTRACT

In a transverse-pumped, solid-state laser, a nonabsorptive cladding surrounds a gain medium. A single transverse mode, namely the $TEM_{00}$ mode, is provided. The $TEM_{00}$ mode has a cross-sectional diameter greater than a transverse dimension of the gain medium but less than a transverse dimension of the cladding. The required size of the gain medium is minimized while a threshold for laser output is lowered.

14 Claims, 2 Drawing Sheets

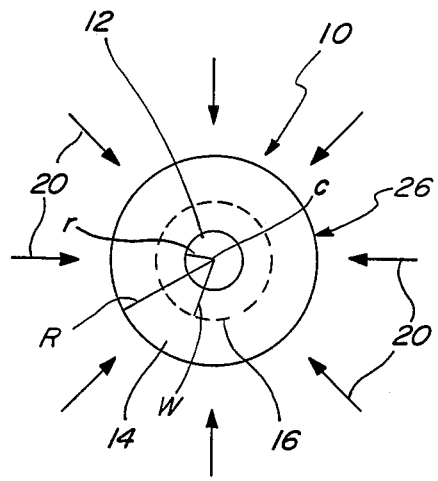
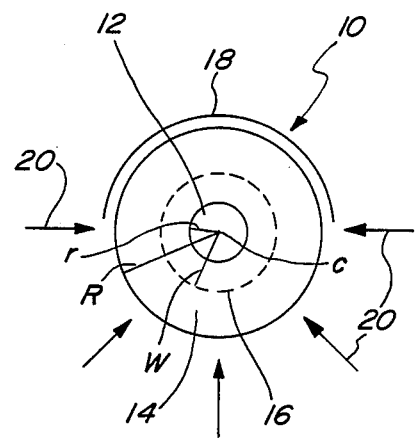
FIG. 1
FIG. 2
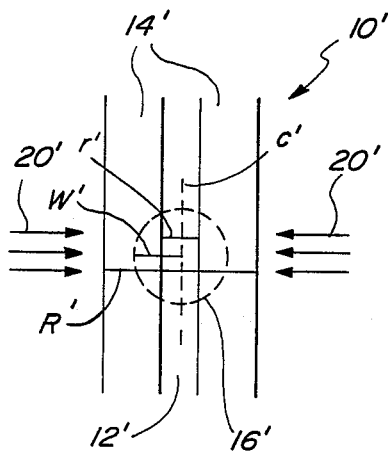
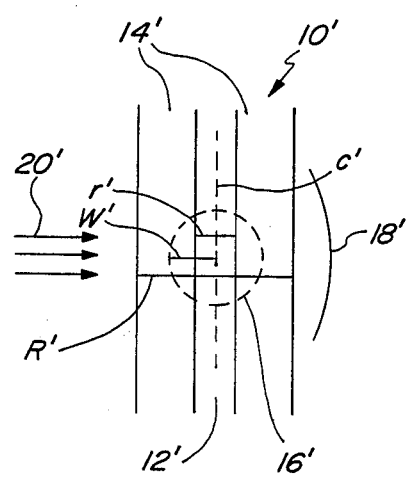
FIG. 3
FIG. 4

CLADDING FOR TRANSVERSE-PUMPED SOLID-STATE LASER

ORIGIN OF THE INVENTION

The invention described herein was made in the performance of work under a NASA contract, and is subject to the provisions of Public Law 96-517 (35 USC 202) in which the Contractor has elected not to retain title.

TECHNICAL FIELD

The present invention generally relates to energy amplification devices such as lasers and, more specifically, to an improved method and apparatus for maximizing the extraction of energy upon amplification from a transverse-pumped solid state laser and the like.

BACKGROUND

In certain applications, such as material processing, it is desirable to have a laser whose output is restricted to the $TEM_{00}$ mode. The desirability results from, among other things, the substantial absence of phase reversal across the output beam, the high spatial coherence, and the small beam divergence. However, the particular pumping geometry of the laser creates problems in utilizing and providing a $TEM_{00}$ operational mode.

In the past, the pumping geometry has been generally either longitudinal or transverse. In the former geometry, a pump beam is colinear with the laser mode. With that geometry, a good transverse mode output is obtained, as well as efficient operation because all of the pump light can be coupled into the laser mode volume. The disadvantage of the longitudinal geometry is that it is difficult to scale to higher powers.

On the other hand, transverse pumping more readily allows scaling to higher powers by pumping the laser with many light sources such as laser diodes in a direction transverse to the longitudinal axis of the laser. But it then becomes difficult to achieve good efficiency and single transverse mode operation at the same time, because most of the pump power is absorbed at the surface of a gain medium in the laser. Therefore, to extract the power absorbed at the surface of the gain medium, the laser mode must have significant intensity at the surface of the gain medium. This makes $TEM_{00}$ mode operation difficult because of the large discontinuity in the index of refraction at the surface of the gain medium. This can be less of a problem for higher order modes whose maximum intensity is spatially different from that of the $TEM_{00}$ mode. If $TEM_{00}$ mode operation is nevertheless desired, the mode must be kept from the surface by the gain medium to avoid the index of refraction discontinuity and resultant loss due to clipping of the spatial mode which might otherwise occur if the mode is on the surface. However, that results in much of the absorbed pump energy at the surface not being extracted.

One past method which attempts to solve the problem of extraction at the surface of the gain medium uses a laser mode which zig-zags down a slab by total internal reflection at the surfaces. This then allows the pump energy at the surface to be extracted. The general problems noted above with transverse pumping have also been addressed in the past by utilizing a composite rod wherein a core of the rod is absorptive and a surrounding sheath that is nonabsorptive. Further, the indices of refraction of both the core and the sheath are the same. The structure is for the purpose of reducing threshold pumping power and increasing the available output. The method, however, does not appear to address the specific problems associated with single transverse mode operation, including $TEM_{00}$ mode operation, nor the extraction of energy at the surface of the gain medium.

A need still exists in the art to provide an improved method and apparatus of transverse pumping a solid state laser or other resonant device in a single transverse mode of operation, and particularly the $TEM_{00}$ mode of operation, which maximizes the absorption of pump power and maximizes the output of the laser.

STATEMENT OF THE INVENTION

Accordingly, it is an object of the present invention to provide an improved apparatus and method for a single transverse mode of operating a solid state laser and the like.

Another object of the present invention is to provide an apparatus and method for transverse pumping a solid state laser and the like.

Yet another object of the present invention is to provide a composite laser that maximizes absorption of pump power in a transverse mode of operation.

Still another object of the present invention is to minimize the required size of a gain medium in a laser while lowering a threshold for laser output.

These and other objects of the present invention are achieved by providing a composite laser that has a core portion that comprises a gain medium. A cladding (which may be undoped) surrounds the gain medium and has the same or nearly the same index of refraction as the gain medium. The cladding does not have absorption at the pump and laser wavelengths nor gain at the laser wavelength. The transverse dimension of the cladding is large enough so that the laser mode intensity is essentially zero at the outside surface of the cladding. A single transverse mode, namely the $TEM_{OO}$ mode, is provided by selecting well-known mirror curvatures that form the resonator. The $TEM_{00}$ mode has a cross-sectional diameter greater than a transverse dimension of the gain medium. Since the pump light is absorbed only by the gain medium, all of the excitation is inside the $TEM_{00}$ mode volume and the pump power can thus be extracted efficiently. The laser operates only in the single transverse mode operation because the overlap between the pump and the $TEM_{00}$ mode is significantly larger than the overlap between the pump and any other higher order transverse mode. Higher order modes have larger diameters and lower on-axis intensity in comparison to the $TEM_{00}$ mode.

The objects of the present invention can best be seen from an examination of the specification, claims, and drawings hereto.

BRIEF DESCRIPTION OF THE DRAWINGS

FIG. 1 is an axial, cross-sectional schematic view of transverse pumping of a laser according to a first preferred embodiment of the present invention;

FIG. 2 is an axial, cross-sectional schematic view of transverse pumping of a laser according to a second preferred embodiment of the present invention;

FIG. 3 is an axial, cross-sectional schematic view of transverse pumping of a laser according to a third preferred embodiment of the present invention;

FIG. 4 is an axial, cross-sectional schematic view of transverse pumping of a laser according to a fourth preferred embodiment of the present invention;

DETAILED DESCRIPTION OF THE INVENTION

The following description person skilled in the art to which the present invention pertains, or with which it is most nearly connected, to make and use the same, and sets forth the best mode contemplated by the inventors of carrying out their invention. While the following embodiments are described hereinafter in reference to solid-state lasers, it should be understood that the present invention contemplates that the application can generally include other energy amplification devices or resonators, such as masers.

Referring to FIG. 1, a composite solid-state laser 10 is shown schematically in cross-section along an axial length thereof. In this particular embodiment, the laser 10 is generally cylindrically shaped and includes a core portion 12 and a cladding portion 14 that surrounds the core portion 12, which composite configuration has been known in the art. The core portion 12 is constructed of a gain medium to provide amplification of light energy. While many suitable materials exist for the gain medium, in this particular embodiment, the gain medium is constructed of neodymium doped yttrium aluminum garnet (Nd:YAG). The cladding portion 14 is then preferably constructed out of only the base material found in the core portion 12. The cladding portion 14 does not have absorption at the light energy pump source (described below) and laser output wavelengths nor gain at the laser output wavelengths, which output is substantially of just one wavelength. With the cladding portion 14 being nonabsorptive, light energy can pass to the core portion 12, which is absorptive.

As shown in FIG. 1, the core portion 12 is generally described by a transverse dimension or a radius r measured from a center C, or described by a diameter of 2r. The cladding portion 14 is generally described by a transverse dimension or a radius R measured from the center C, or described by a diameter of 2R. A transverse mode diameter 16, and specifically a TEM$_{00}$ mode diameter (further described below) is generally described by a transverse dimension or a radius w which, in this particular embodiment, is greater in length than the radius r of the core portion 12 but less than the radius R of the cladding portion 14.

Figure 5:
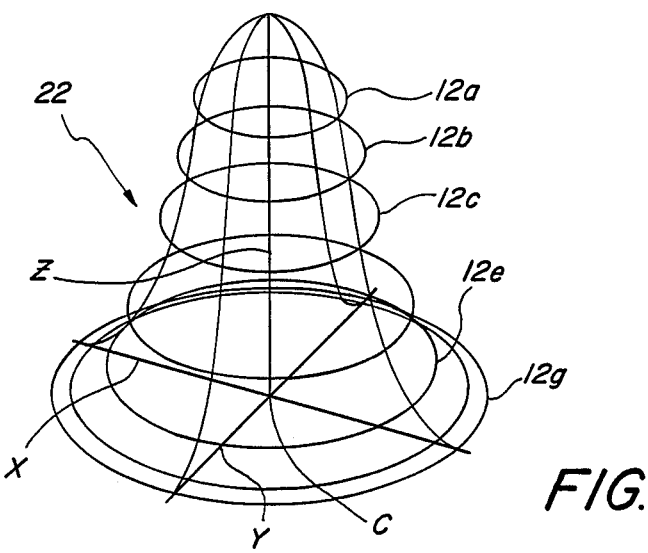
FIG. 5 is a perspective, schematic view of intensity distribution in a TEM$_{00}$ mode of operation according to the present invention.

While lasers in general can operate in multiple transverse modes, according to the present invention, the laser 10 is operated under a single transverse mode which is the TEM$_{00}$ mode. It is well known that the TEM$_{00}$ mode can be generally represented by a Gaussian distribution curve for the output intensity of the laser 10, and one characteristic thereof is a cross-sectional diameter. For purposes of illustrating an ideal model, FIG. 5 shows a three-dimensional energy intensity distribution curve 22 for the laser 10. The curve 22 generally follows the equation:

$$I = I_0 e^{\frac{-2}{w}(X^2 + Y^2)}$$

wherein $I_0$ is the maximum intensity and w is the distance from the center C when the intensity is $e^{-2}$ of that intensity at the center. Intensity of the laser output is plotted along a Z axis and a cross-sectional diameter of the laser output is plotted along an X axis and a Y axis. The circle 12e shown in FIG. 5 may, for example, identify the same cross-sectional diameter 16 with radius w of the TEM$_{00}$ mode shown in dashed lines in FIG. 1.

In this particular embodiment of the present invention, as shown in FIG. 1, the laser 10 is pumped by a series of light sources (not shown), such as laser diodes, which are positioned outside of and along the axial length of the laser 10. The light sources produce plurality of light rays 20 in a direction transverse to the axial length of the laser 10. The rays 20 pass through the nonabsorbing cladding portion 14 and are then absorbed in the core portion 12 where amplification occurs according to well-known principles.

Referring again to FIG. 5, the reference numerals 12a ... g represent a plurality of potential diameters for the core portion 12, one of which may be selected for use. According to the present invention, when the TEM$_{00}$ mode diameter 16 is larger than the selected core portion diameters, maximum utilization of energy absorption by the core portion 12 can be achieved. If the diameter 2r of the core portion 12 ia greater than the diameter 16 of the TEM$_{00}$ mode, energy utilization is not maximized. This is due in large part to the fact that most of the absorption occurs at the surface of the gain medium, as shown in FIGS. 7a, 7b.

Figure 7A:
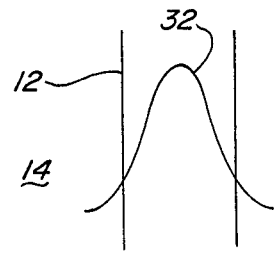
FIG. 7a is a schematic view showing intensity distribution of a TEM$_{00}$ mode in relation to a cross-section of gain medium according to the present invention.
Figure 7B:
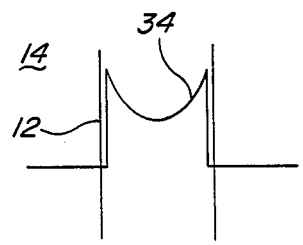
FIG. 7b is a schematic view showing gain distribution relative to a cross-section of gain medium.

FIG. 7b depicts a model relationship between absorption (or gain) versus the core portion 12 in cross-section. A gain distribution curve 34 shows that little or no gain occurs in the cladding portion 14. However, at the surface of the core portion 12, the gain is at a maximum. The gain diminishes to a minimum near the center of the core portion 12. FIG. 7a depicts an intensity output distribution curve 32 of a TEM$_{OO}$ mode versus a core portion 12 in cross-section. Maximum intensity is seen near the center of the core portion 12 and the intensity drops off towards the surface.

By comparing FIGS. 7a and 7b, it can be appreciated that if the surface (or diameter) of the core portion 12 extends beyond the TEM$_{00}$ mode diameter 16, a significant amount of absorbed energy cannot be utilized. Indeed, it is for that reason that the selected core portion diameter 12a ... g is preferably smaller than the TEM$_{00}$ mode diameter 16. With such a relationship, the outer surface of the core portion 12 remains substantially within the area of the TEM$_{00}$ mode which has the maximum intensity. As shown in FIG. 5, this is particularly true of diameters 12a, b, c, if, for example, the TEM$_{00}$ mode diameter is represented by reference numeral 12e. Further, with the TEM$_{00}$ mode diameter being greater than the core portion diameter, the avoidance of index of refraction discontinuity is maximized. Consequently, according to the present invention, the cladding portion 14 and the core portion 12 are preferably constructed of materials having substantially the same index of refraction to prevent such discontinuity.

While FIGS. 1 and 5 show that the TEM$_{00}$ mode diameter is greater than the core portion diameter, the present invention contemplates that the TEM00 mode diameter 16 can be substantially equal to the core portion diameter 2r. Further, while FIG. 1 depicts the TEM$_{00}$ mode diameter 16 to be approximately equal to one-half of the difference between the cladding portion diameter and the core portion diameter, such relationship can vary. It is preferred that the relationship among the diameters be approximately as follows: $\frac{2}{3} R \geq w \geq r$. The condition of having $w \geq r$ is simply the TEM$_{00}$ radius being larger than the core radius. The condition of having $\frac{2}{3} R \geq w$ is to limit clipping of the tails of the TEM$_{00}$ mode at a cladding-air interface 26. Theoretically, in a Gaussian intensity distribution 22, the intensity goes to zero when the distances X and Y (FIG. 5) are at infinity. When $\frac{2}{3} R \geq w$, the cladding-air interface 26 is far enough from the center C such that the power at the interface 26 is small. In any event, the transverse dimension of the core portion 12 should be large enough so that most of the pump energy is absorbed. This typically means that the dimension should be one or more absorption lengths of the pump wavelength, i.e., the wavelength at which the Nd ions absorb the light source radiation.

FIG. 2 depicts another embodiment of the present invention which is generally identical to the first embodiment shown in FIG. 1. However, in the second preferred embodiment, a reflecting element 18, such as a mirror, is disposed adjacent to an exterior portion of the laser 10. By so doing, the light rays 20 which pass through and exit the laser 10 are reflected by the reflecting element 18 back into the laser 10 wherein the core portion 12 essentially obtains another opportunity for absorption. This feature allows the cross-section of the core portion 12 to be made smaller yet absorb the same amount of pump light 20, which effectively lowers the threshold energy necessary for amplification.

FIG. 3 schematically shows a third embodiment of the present invention wherein a laser 10' is in a slab configuration rather than a rod configuration as in the first and second embodiments. Like in the first two embodiments, the third preferred embodiment includes a core portion 12' constructed of a gain medium. A cladding portion 14' is located on either side of the core portion 12' to sandwich the core portion 12' therebetween. The thickness or transverse dimension of the core portion 12' is generally denoted by a distance r', while the thickness of the cladding 14' between the two exterior sides is generally denoted by R'.

As in the first two embodiments described above, the third preferred embodiment also provides for a TEM$_{00}$ mode of operation whose diameter is generally denoted by a radius equal to w', as measured from a center line c'. As depicted in FIG. 3, the TEM$_{00}$ mode diameter 16' is preferably greater than the transverse dimension r' of the core portion 12' but less than the transverse dimension R' of the cladding portion 14'. Thus, when a light energy source (not shown) pumps light rays 20' transverse into the laser 10', the light absorption is optimized like in the two preferred embodiments described above.

FIG. 4 depicts a fourth preferred embodiment of the present invention wherein the laser 10' is similarly constructed like that in the third preferred embodiment. However, a reflecting element 18' is provided in a fashion and for a function similar to that described in the second preferred embodiment. As described above, the TEM$_{00}$ mode diameter 16' is preferably greater than the transverse dimension of the core portion 12'.

Figure 6:
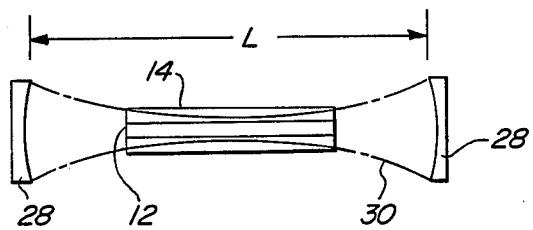
FIG. 6 is a schematic view of an assembly to provide a specific TEM$_{00}$ mode diameter according to the present invention.

It was noted above that the TEM$_{00}$ mode diameter could vary in relation to a particular transverse dimension of gain medium and a transverse dimension of the cladding. An example of the manner in which the TEM$_{00}$ mode diameter is controlled to provide the necessary relationship is shown in FIG. 6. According to well-known principles in the art, the mirrors 28 can be constructed with specific curvatures and a spacing L therebetween to select a size of the TEM$_{00}$ mode output 30.

The above description only describes certain preferred embodiments of the present invention, and it is contemplated that modifications to the above can be made but which nevertheless come within the scope of the claims.

We claim:

1. In an improved method for pumping a laser oscillator, the improvement comprising:
   producing a TEM$_{00}$ mode diameter that is at least approximately equal to a transverse dimension of a gain medium of said laser oscillator; and
   substantially equalizing a first index of refraction of said gain medium with a second index of refraction of a cladding surrounding said gain medium.

2. The improvement of claim 2 wherein said TEM$_{00}$ mode diameter is greater than said transverse dimension of said gain medium.

3. The improvement of claim 1 wherein said cladding is constructed to substantially eliminate energy absorption and gain that might result otherwise from an impinging energy source.

4. The improvement of claim 1 wherein there is only a single transverse electromagnetic mode of operation.

5. In an improved method for transverse pumping a laser having a gain medium surrounded by a cladding whose index of refraction is substantially the same as that of said gain medium, the improvement comprising:
   providing only one transverse operating mode which is a TEM$_{00}$ mode, said TEM$_{00}$ mode having a cross-sectional diameter that is greater than a transverse dimension of said gain medium and less than a transverse dimension of said cladding; and
   constructing said cladding to substantially eliminate energy absorption and gain that might otherwise result from impinging light rays.

6. The improvement of claim 5 further including the step of positioning a reflecting means adjacent said laser for reflecting light from said light source back into said laser after said light has passed through said laser.

7. The improvement of claim 5 further including the step of making said transverse dimension of said gain medium approximately equal to at least one absorption length at a wavelength of said light source.

8. The improvement of claim 5 further including the step of making said transverse dimension of said cladding of a length such that a laser mode intensity is substantially zero at an external surface of said cladding.

9. A resonator assembly, comprising:
   energy source means for pumping energy; and
   energy receiving means for receiving energy pumped from said energy source means in a transverse direction, said energy receiving means including absorbing means for absorbing and amplifying said energy, and also having only a single transverse mode of operation which is defined by a diameter at least equal in length to a transverse dimension of said absorbing means.

10. The resonator assembly according to claim 9 wherein said energy receiving means further includes nonabsorbing means surrounding said absorbing means and which allows said energy to pass to said absorbing means without absorption.

11. The resonator assembly according to claim 9 wherein said absorbing means and said nonabsorbing means each have substantially the same index of refraction.

12. The resonator assembly according to claim 11 wherein said transverse mode is a $TEM_{00}$ mode.

13. The resonator assembly according to claim 12 wherein said diameter is greater than said transverse dimension.

14. The resonator assembly according to claim 13 wherein said dimension is less than a transverse dimension of said nonabsorbing means.

* * * * *